Dec. 19, 1967   F. W. HAUF ETAL   3,358,514
GYROSCOPE

Filed March 19, 1965   4 Sheets-Sheet 1

INVENTORS
FREDERICK W. HAUF
DONALD W. HOLMES

Dec. 19, 1967  F. W. HAUF ET AL  3,358,514
GYROSCOPE

Filed March 19, 1965  4 Sheets-Sheet 3

INVENTORS
FREDERICK W. HAUF
DONALD W. HOLMES
BY
ATTORNEY

Dec. 19, 1967  F. W. HAUF ETAL  3,358,514
GYROSCOPE

Filed March 19, 1965  4 Sheets-Sheet 4

INVENTORS
FREDERICK W. HAUF
DONALD W. HOLMES
BY
ATTORNEY

United States Patent Office 3,358,514
Patented Dec. 19, 1967

3,358,514
GYROSCOPE
Frederick W. Hauf, Santa Ana, and Donald W. Holmes, La Mirada, Calif., assignors to North American Aviation, Inc.
Filed Mar. 19, 1965, Ser. No. 442,234
1 Claim. (Cl. 74—5.7)

ABSTRACT OF THE DISCLOSURE

A gas bearing, free rotor gyroscope in which the rotor is supported by a layer of gas which is automatically generated by the shearing action which takes place in the gap between the surfaces of the spinning rotor and its center ball support is operated at speeds less than 100 revolutions per second with minimum input power and minimum azimuth drift.

---

This invention relates to a gyroscope and a method for operating a gyroscope and more particularly to a gyroscope and a method for operating a gyroscope which utilizes a gas bearing.

When utilizing gyros or inertial instruments certain applications require relatively low power consumption. Normally, however, low power in the case of gyros means relatively low speed of the gyro which in turn normally results in relatively high random drift rate and hence inaccurate inertial instruments. Consequently, low speed gyros formerly could only be utilized where the requirements for accuracy were very low.

In practicing the present invention, a gas bearing free rotor gyro is utilized. It has been discovered that such a gyro can be utilized at very low range of speeds of rotation of the gyro rotor and when operating the gyro rotor in this range of speeds, the random drift rate due to causes other than gravitational effect is a minimum and relatively constant and the power required to operate the gyro is also at a minimum.

Accordingly, an object of the invention is to provide a new and improved gyro and a method for operating a gyro.

Still another object of the invention is to provide a method for operating a gyro at relatively low power levels but with a very high degree for accuracy.

Still a further object of the invention is the provision of a gas bearing gyro and a method for operating the gas bearing gyro at relatively low speeds and with a minimum random drift rate.

Other objects of this invention will become apparent from the following description taken in connection with the accompanying drawings in which.

A gyroscope illustrated in patent application Ser. No. 641,720, filed Feb. 21, 1957, in the name of Donal B. Duncan et al., entitled "Free Rotor Gyroscope," now Patent No. 3,251,233, is utilized in the present invention and is illustrated in FIG. 1 to FIG. 7.

Figure 1:
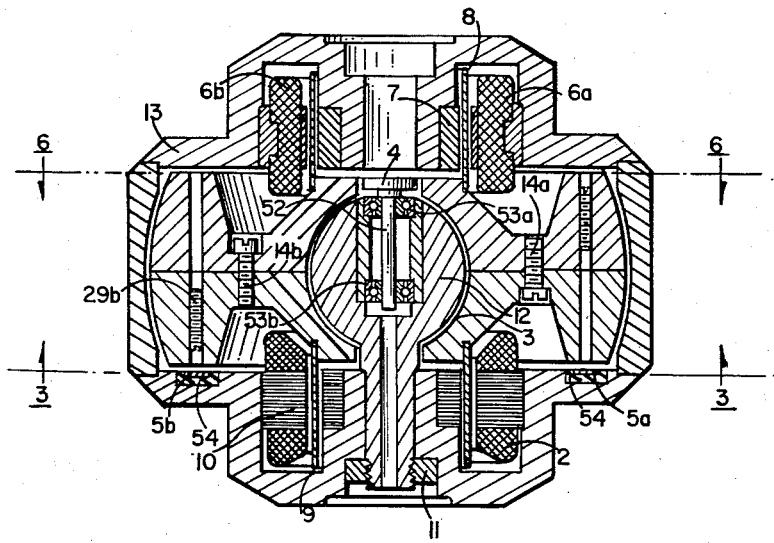
FIG. 1 shows an elevation cross section of a gyroscope utilized in an embodiment of the invention.

Referring to FIG. 1, an embodiment of the gyroscope is shown comprising a rotor 1 supported by spherical gas bearing 3 which is located between fixed center ball support 12 and the rotor. Case 13 encloses the device and should be properly sealed if the gas used is other than air or if the air bearing is pressurized. The center ball support is attached to mount 11 which is fixedly supported by the case. Center ball support 12 is, then, an extension of case 13 and is cantilevered thereto. The radial clearance between the ball and rotor is very small and would be, for example, about .0003 inch with a ball support $1\frac{3}{16}$ inches in diameter. The bearing can be auto-lubricated (i.e., it can operate without external pressurization, the supporting gas film being self-generated by the spinning rotor), or provisions can be made to pressurize it. A gas such as helium may be used in place of air to cut down windage torques. Since helium has substantially the same viscosity as air, but lower density, it serves this purpose without a loss of support for the rotor.

Figure 7:
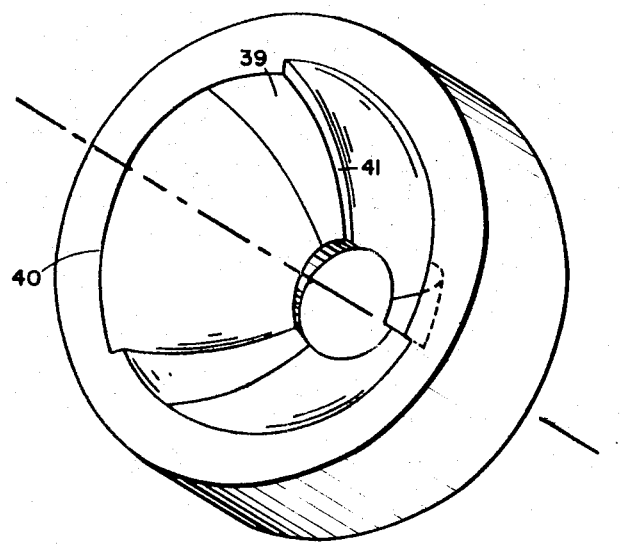
FIG. 7 illustrates thrust pads etched on the inner surfaces of the rotor.

Tapered pads as illustrated in FIG. 7 are etched by chemical means into those surfaces of the rotor concentric with the center ball to support the thrust loads. These pads consist of surface sectors or lands 30 separated by inclined wedge-shaped sectors 40, and are described in North American Aviation co-pending application of Joseph S. Acterman, Ser. No. 416,995, filed Mar. 18, 1954, entitled, Autolubricated Gas Thrust Bearing, abandoned Dec. 22, 1956. A preferred form of this bearing has three equally spaced lands around the circumference with the wedge-shaped portions extending about 96° and the lands 24°. Maximum depth 41 of the wedges for a rotor with a $1\frac{3}{16}$ inch inner diameter would be about .0003 inch. In operation, a load supporting layer of gas is automatically generated by the shearing action which takes place in the gap between the complementary surfaces in the spinning rotor and the center ball. The use of such thrust pads enables satisfactory operation of the gyroscope with its rotation axis in any plane, and is essential where the device is to be operated in a rapidly maneuvering vehicle. Another form is one in which the wedge sectors such as 40 are of uniform depth. Or, still another, one in which the depressions are formed in the center ball.

Figure 3:
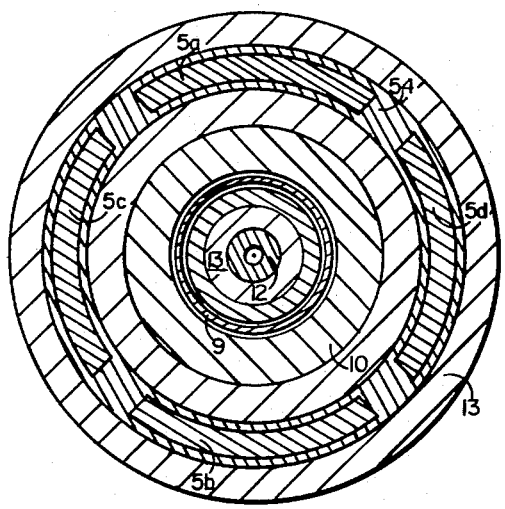
FIG. 3 shows a bottom cross section of an embodiment of the invention represented as cut by a plane 3—3 as indicated in FIG. 1.

Referring to FIGS. 1 and 3, motor stator windings 2 provide the electromagnetic drive force for rotor 1 and are excited by an alternating current source (not shown). Flux ring 10 of laminated silicon steel which is fixedly mounted on the case 13 provides a flux path for the rotating magnetic field generated by the stator windings. Copper sleeve 9 is attached to the rotor 1. Eddy currents are produced in this copper sleeve by the magnetic field generated by the field windings acting in conjunction with the flux ring. These eddy currents generate a magnetic field which coacts with the field generated by the field windings and flux ring to produce a drive torque for the rotor.

In the embodiment shown in FIG. 1, the rotor is fabricated in two identical halves to facilitate assembling the gyro. These two halves are held together by machine screws 14a, 14b, 14c and 14d (see FIG. 6). It is recommended that the rotor be fabricated of a light nonmagnetic material such as aluminum with a hard surface such as a hard chromium plating will provide. This is not essential, however, and any suitable durable material will suffice.

Referring to FIG. 3, capacitor pickoff plates 5a, 5b, 5c, and 5d of which there are two opposite pairs, are so oriented that each pair 5a 5b and 5c, 5d will provide a signal indicative of motion of the gyroscope case about each of the two axes normal to the axis of rotor rotation. These pickoff plates are mounted in and insulated from the case by insulator ring 54, and are oriented as indicated in FIG. 3. The insulator ring is bonded to the case. Capacitors are formed between the pickoff plates 5a, 5b, 5c and 5d and the rotor 1. It is necessary that the spacing between the rotor and the case be very close to assure adequate pickoff sensitivity of these capacitors.

Figure 4:
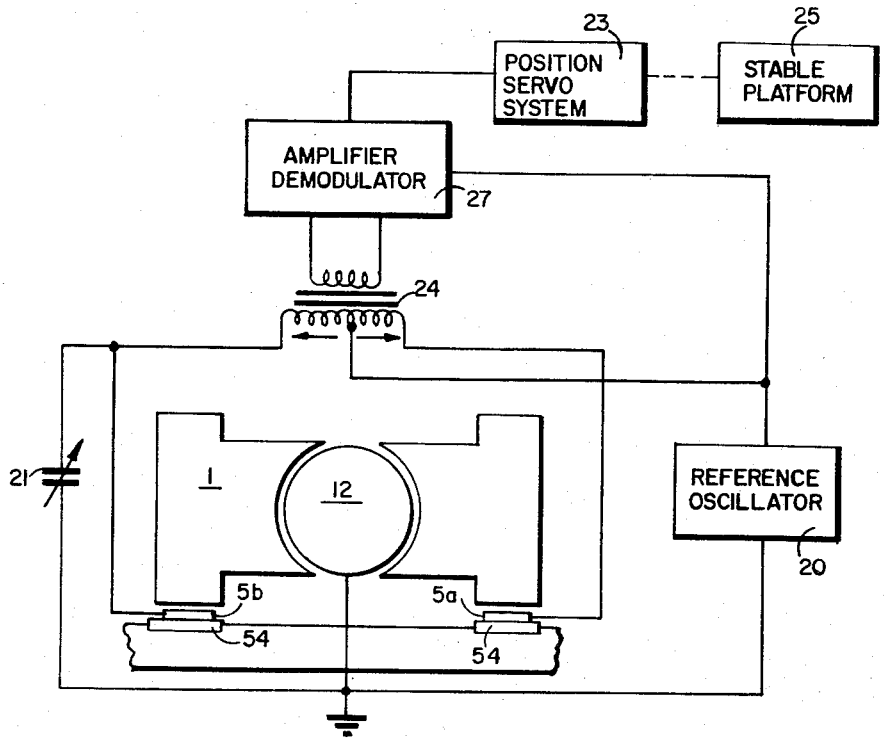
FIG. 4 is a schematic of the capacitor pickoff circuitry.

As is well known in the art, the capacitance of a capacitor increases as its plates are brought closer together. In order to obtain usable capacitances for this application, it is necessary that the spacing between the rotor and the pickoff plates be in the neighborhood of .010 inch. For a minute motion of the case relative to the rotor on either axis normal to the rotation axis, the capacitances of oppositely oriented capacitors will change. The capacitor formed by the plate and adjacent portion of the rotor coming closer together will increase in capacitance while the opposite one with plate and rotor moving apart will decrease. Referring now to FIG. 4, these capacitors formed by the rotor 1 and the pickoff plates 5a and 5b, mounted on case 13, are connected across the primary winding of transformer 24. An oscillator 20 provides a reference signal. Neither the frequency of this oscillator nor its stability requirements are critical. Any suitable audio or radio frequency may be used. The capacitors formed between the pickoff plates and the rotor are effectively coupled between the oscillator and ground, through the path from the rotor 1 and the capacitance between the rotor and fixed center ball 12. If the two opposite capacitances are identical, then the current through each to ground will be the same. As the currents through the capacitors flow through the primary of the transformer 24 in opposite directions as indicated by the arrows, the resultant current in both primary and secondary of the transformer will be zero. If one capacitor has a greater capacitance than the other (due to movement of the gyro case), the current flow through it will be greater. There will then be a resultant current flow through the transformer bearing a phase relationship with the reference signal which depends on which capacitor is the greater. The amplitude of this current flow indicates the magnitude of this difference of capacitance. The resultant voltage in the transformer secondary is amplified and demodulated by amplifier-demodulator 22. The demodulator can be any accurate phase detector which will give a D-C output whose polarity indicates which capacitance is the greater and whose amplitude indicates the magnitude of the difference of capacitance. This output signal is fed to an appropriate position servo system 23 so as to drive the stable platform 25 on which the gyro case is mounted to correct the unbalance and again equalize the capacitances. In this manner, a platform can be kept stabilized in space at all times regardless of the angular rotation of the vehicle in which it is carried. Amplifier-demodulators and servo systems to accomplish this result are well known in the art. Trimmer capacitor 21 is used to adjust the circuit capacitance to compensate for errors in the system so that electrical balance is achieved when the rotor and stator are actually in their mechanical stabilized position.

Referring again to FIG. 1, rotatable stop pin 4 positively limits the motion of rotor 1 about the axes to the rotation axis. "Positive" limitation of the motion of rotor 1 about axes normal to the rotation axis indicates that there is provided physical structure which limits such motion of the rotor under all circumstances. That is, the rotor cannot rotate about an axis normal to its rotation axis in excess of that allowed by the "positive" limit stop. In a preferred embodiment, this step pin is attached to a shaft 52 which is freely rotatable in ball bearing races 53a and 53b. For several reasons, a preferred form has the top and bottom of the rotor machines flat. One of these involves stability. Experimentation indicates that the moment of inertia about the spin axis should be larger than that about the cross axes for optimum stability. It is also necessary that we have two flat surfaces, in this instance formed by the bottom of the rotor and the case, to facilitate mechanization of a signal pickoff device. If the rotor were completely spherical, it would be more difficult to sense minute motion of the case relative to it. In order that the pickoff elements can be mounted in close proximity to provide usable capacitances and at the same time avoiding contact between case and motor, it is necessary that the freedom of motion between case and rotor be limited to a few milliradians. Stable rotatable stop pin 4 acts to limit such motion. The stop pin must be freely rotatable so as to limit friction when the rotor comes into contact with it. The importance of the design of this pin was determined after considerable experimentation with various other types of fixed stop pins.

Figure 6:
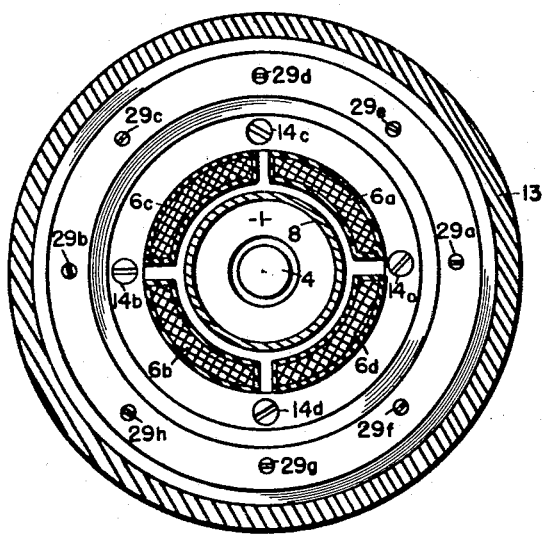
FIG. 6 shows a top cross section of an embodiment of the invention represented as cut by a plane 6—6 as indicated in FIG. 1.

There are various torques acting on the rotor which tend to remain constant. These include bias torques caused by such factors as asymmetry of the gas bearing due to the geometric shape of the bearing parts of asymmetry in the magnetic field of the motor stator and torques due to to the earth's rotation. Referring to FIGS. 1 and 6, these are compensated for by the eddy current torquer which includes four windings, 6a, 6b, 6c, 6d, operating oppositely oriented pairs (6a, 6b and 6c, 6d). The torque flux ring 7 which is fabricated of a suitable magnetic material and is fixed to the case 13 provides a flux path for the magnetic field generated by the torquer windings. Eddy currents to provide the driving torque are generated in electrically conductive nonmagnetic sleeve 8 which is attached to the rotor. This sleeve may be fabricated of a material such as manganin, an alloy comprised of copper, manganese and nickel which changes very little in resistance with temperature. The torque generated which acts on the rotor through the sleeve 8 is proportional to the product of the flux density and the eddy current in the sleeve. But the eddy current itself is proportional to flux density; hence, torque is proportional to the square of the flux density or to the square of the current in each coil winding.

Figure 5:
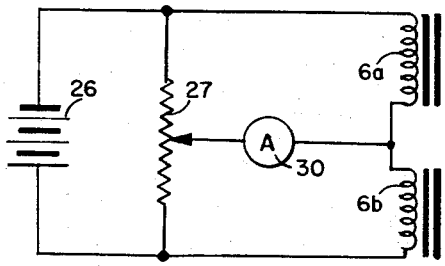
FIG. 5 is a schematic of the circuitry for the eddy current torquer.

With opposite coils energized simultaneously, the net torque about the transverse axis is proportional to the difference of the square about the two currents. Referring to FIG. 5, a push-pull torquer control circuit which may be utilized is illustrated. The difference between the two current is maintained constant, and the precession rate is a linear function of this difference. A fixed direct current supply 26 provides the bias current necessary to compensate for the particular situation at hand. Variable resistor 27 is used to adjust the current in torquer bias coils 6a and 6b to any desired difference relationship. This difference can be read on an ammeter 30 in series with the current feed to both coils as indicated.

If we have equal currents in windings 6a and 6b, there will be no net torque acting on the gyro rotor via the sleeve 8. A greater current in one winding will result in a rotor torque, the direction of this torque depending on which winding has this greater current. This torque is proportional to the magnitude of the difference of the squares of the current in the two windings. By adjustment of variable resistor 27, a constant torque of the desired direction and magnitude can be generated. Windings 6c and 6d, oriented normal to 6a and 6b have identical control circuitry and operate in the same manner. The two torquing forces generated by 6a, 6b and 6c, 6d respectively can be adjusted so that they are equal and opposite to constant error torques due to the earth's motion and to the electrical and mechanical imperfections in the gyro itself. In the manner, gyro errors due to such error torques can be minimized.

Referring to FIGS. 1 and 6, adjusting screws 29a, 29b, 29c, 29d, 29e, 29f, 29g, and 29h are used to balance the rotor. As in any device of this type, it is essential that the rotating member be balanced precisely radially, axially and dynamically, and these adjustments must be made to achieve this end. Eight adjusting screws spaced equally around the flywheel portion of the rotor and positioned as indicated in FIG. 6 will be adequate if four are used for radial and axial balance and four for dynamic balance. Radial balance can be achieved by removing material from the appropriate sets of balance screws while axial and dynamic balance can be accomplished by repositioning appropriate sets of screws along the rotation axis. Dynamic balance is essential to eliminate sinusoidal interference at the rotor frequency in the pickoff signal.

Figure 2:
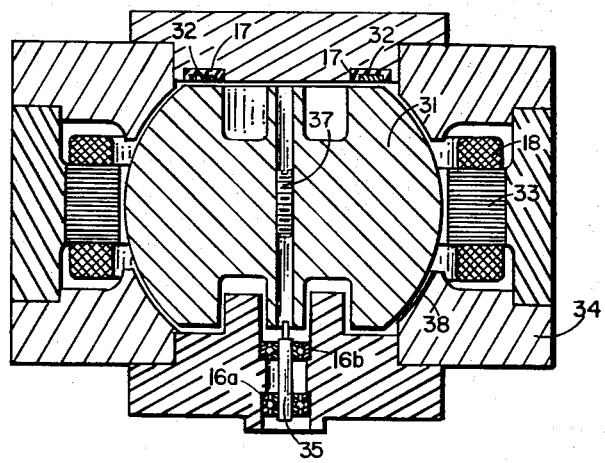
FIG. 2 shows an elevation cross section of another gyroscope which can be utilized in an embodiment of the invention with an electromagnetic rotor drive in which the rotor consists of a centrally located sphere and the air bearing is formed between this sphere and the surrounding case.

Referring to FIG. 2, an embodiment of the invention with a centrally located spherical rotor is illustrated. The spherical gas bearing 38 which supports the rotor 31 is located between the rotor and the case 34. Motor field windings 18 are excited by an alternating current source (not shown). Flux ring 33 of laminated silicon steel which is fixedly mounted on the case 34 provides a flux path for the rotating magnetic field generated by the field windings.

The rotor may be fabricated of a nonmagnetic but electrically conductive material such as aluminum. Eddy currents are produced in the rotor by the rotating magnetic field generated by the field windings acting in conjunction with the flux ring. These eddy currents themselves generate a magnetic field which coacts with the field generated by the field windings and flux ring to produce a drive torque for the rotor.

Pickoff plates 32 of which there are two opposite pairs, function similarly to that described for the embodiment illustrated in FIG. 1, and the same circuitry as that illustrated in FIG. 4 and already described may be used to maintain alignment of rotor and case. The pickoff plates 32 are mounted in an insulator ring 17 to insulate them from the case in the same manner as in the embodiment illustrated in FIG. 1.

No eddy current torquer is shown in this embodiment, but may be added if additional accuracy is desired. Stable stop pin 35 is freely rotatable on ball bearing races 16a and 16b and limits rotor motion in the same manner as described for the first embodiment. Only one balancing adjustment screw 37 need be used.

This second embodiment is simpler and easier to fabricate than the first, and although it is not as precise as the embodiment illustrated in FIG. 1, it can be used where the application does not demand the additional complexity.

Figure 8:
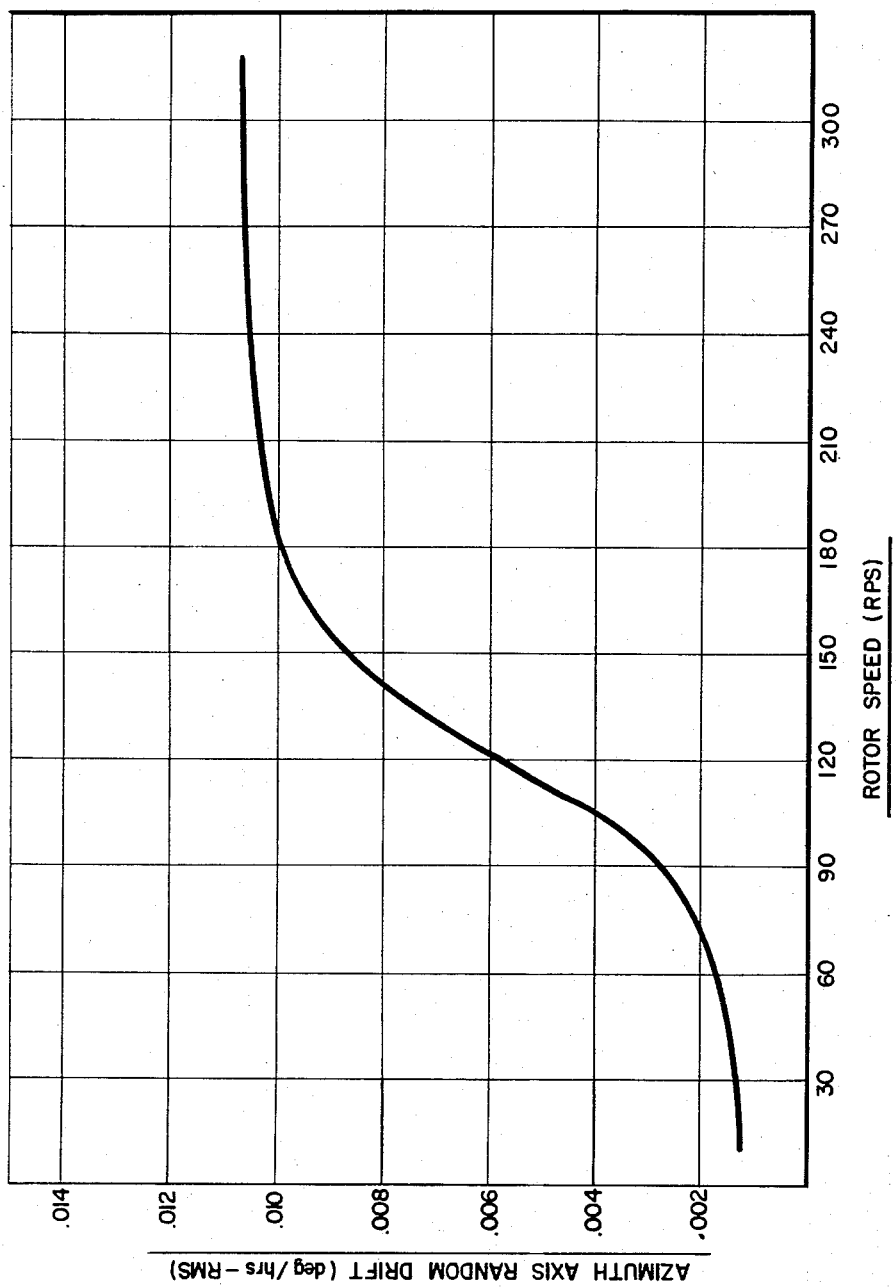
FIG. 8 illustrates a graph useful in explaining the invention.

FIG. 8 is a graph illustrating performance characteristics of the gyros illustrated in FIGS. 1 and 2. This graph plots the azimuth axis random drift against rotor speed in revolutions per second. The spin axis of the gyro was positioned vertical with respect to the surface of the earth and parallel to the gravitational vector. This enabled an observation of random drift rate of the gyro exclusive of gravitational effects. Hydrogen gas was used in the spherical bearing. Consequently, in a low gravitational environment, such as orbital or space flights, this method or device has unique application. It has been discovered as illustrated in this graph that for rotor speeds less than one hundred revolutions per second, the azimuth drift rate is at a minimum and the input power required is also substantially a minimum. Consequently, when these gas bearing free rotor gyroscopes are operated with a rotor speed of one hundred cycles or less, the drift rate of the gyroscope is at a minimum. When operating in this speed range, the power required is at:

| Rotor speed, cycles/sec.: | Input power, watts |
|---|---|
| 100 | 7.0 |
| 60 | 3.5 |
| 40 | 3 |
| 20 | 1.5 |
| 10 | [1] 1.1 |

[1] (Lowest point on curve.)

The above listed input power is the minimum power input for the corresponding speed. Thus, it is seen that for many applications where low power and high accuracy are of importance, the gas bearing free rotor gyroscope can be operated in the above speed range to satisfy exacting drift rate and power requirements.

As a comparison of a power required at higher speeds, the power input required at a 156 revolutions per second is a minimum of 13 watts for these gyros.

Although this invention has been described and illustrated in detail, it is to be clearly understood that the same is by way of illustration and example only and is not to be taken by way of limitation, the spirit and scope of this invention being limited only by the terms of the appended claim.

We claim:

A gyroscope for use in a low gravitational environment comprising in combination:
  a rotor;
  support means for said rotor, at least a portion of said support means comprising a spherical member to which said rotor is externally concentric, said rotor having a spherical surface adjacent to said spherical support member so that a spherical gas bearing to support said rotor is formed between said rotor's spherical surface and said spherical support member, said supporting layer of gas being automatically generated by the shearing action which takes place in the gap by virtue of the relative speed of rotation between said rotor's spherical surface and said spherical member of said support means;
  means for rotating said rotor at a given speed within a range of from 10 to 40 cycles per second.

References Cited

UNITED STATES PATENTS 1,145,025  7/1915  Leavitt _____ 74—5.7 X
3,276,267  10/1966  Lindberg et al. _____ 74—5.7

FOREIGN PATENTS 140,142  3/1920  Great Britain.

FRED C. MATTERN, Jr., Primary Examiner.

CORNELIUS J. HUSAR, Examiner.

J. D. PUFFER, Assistant Examiner.